(12) United States Patent
Janajreh et al.

(10) Patent No.: US 9,468,899 B2
(45) Date of Patent: Oct. 18, 2016

(54) SYSTEM AND METHOD FOR CONTINUOUS TRANSESTERIFICATION OF OILS

(71) Applicant: Masdar Institute Of Science And Technology, Abu Dhabi (AE)

(72) Inventors: Isam M. Janajreh, Abu Dhabi (AE); Rasha Abd Rabu, Abu Dhabi (AE)

(73) Assignee: Masdar Institute of Science and Technology, Abu Dhabi (AE)

( * ) Notice: Subject to any disclaimer, the term of this patent is extended or adjusted under 35 U.S.C. 154(b) by 299 days.

(21) Appl. No.: 13/950,499

(22) Filed: Jul. 25, 2013

(65) Prior Publication Data
US 2015/0027036 A1 Jan. 29, 2015

(51) Int. Cl.
*B01J 19/24* (2006.01)
*B01J 8/06* (2006.01)
*C10L 1/02* (2006.01)

(52) U.S. Cl.
CPC ............... *B01J 19/243* (2013.01); *B01J 8/065* (2013.01); *B01J 8/067* (2013.01); *B01J 19/2425* (2013.01); *C10L 1/026* (2013.01); *C10L 2200/0476* (2013.01); *C10L 2290/56* (2013.01); *Y02E 50/13* (2013.01); *Y02P 30/20* (2015.11)

(58) Field of Classification Search
CPC B01J 19/2405; B01J 19/2415; B01J 19/242; B01J 19/2425; B01J 19/243; B01J 19/244; B01J 19/245; B01J 19/2455
USPC ........................................................ 422/641
See application file for complete search history.

(56) References Cited

U.S. PATENT DOCUMENTS

| 8,153,058 B2 * | 4/2012 | Araiza ................... C02F 1/325 210/748.1 |
| 2007/0149795 A1 | 6/2007 | Fleisher et al. |
| 2015/0315022 A1 * | 11/2015 | Perez ................... C01B 17/806 423/522 |

FOREIGN PATENT DOCUMENTS

WO 2007065211 A1 6/2007

OTHER PUBLICATIONS

PCT International Search Report and Written Opinion mailed Nov. 14, 2014, received in corresponding PCT Application No. PCT/IB14/01395, 10 pgs.

* cited by examiner

*Primary Examiner* — Lessanework Seifu
(74) *Attorney, Agent, or Firm* — Grossman Tucker Perreault & Pfleger, PLLC

(57) ABSTRACT

A multi-chamber continuous tubular reactor for the transesterification of oil (e.g., waste cooking oil and the like) and methanol into glycol and fatty acid methyl (ethel) ester. The reactor includes a plurality of tubes, a plurality of fluidly coupled chambers, an inlet fluidly coupled to a first chamber of the plurality of chambers for receiving reactants, and an outlet fluidly coupled to a second chamber of the plurality of chambers for receiving products generated during a reaction within the plurality of chambers. At least one of the plurality of tubes is at least partially disposed within a lumen of another one of the plurality of tubes. The plurality of fluidly coupled chambers are defined, at least in part, by the plurality of tubes. The reactor is configured to generate a generally helical flow pattern through at least one of the plurality of chambers.

17 Claims, 3 Drawing Sheets

SYSTEM AND METHOD FOR CONTINUOUS TRANSESTERIFICATION OF OILS

CROSS-REFERENCE TO RELATED APPLICATIONS

N/A

TECHNICAL FIELD

The present invention relates to systems and method for transesterification of oils and more particularly, to systems and methods for continuous transesterification of oils using a multi-chamber tubular reactor.

BACKGROUND INFORMATION

Biodiesel is becoming an increasingly important alternative to petroleum based fuels. Biodiesel includes a fatty acid methyl or (ethel) esters (hereinafter referred to as FAME) produced from trigylcerides as the product of vegetable, lipid, animal, trapped grease, or recycled cooking oil (collectively referred to herein as WCO). Biodiesel is becoming an important alternative fuel for a variety of reasons. For example, biodiesel may be compatible with traditional petroleum-based diesel internal combustion engines with little to no modifications being necessary. Additionally, combustion of biodiesel in internal combustion engines is generally cleaner burning than petroleum based diesel and produces less emission of particulate matter, carbon dioxide, sulfur dioxide, and organics compared to petroleum based diesel. Moreover, because biodiesel can be produced using waste materials, it is environmentally friendly.

One of the limitations associated with biodiesel is related to the manufacture of biodiesel. Biodiesel is essentially produced in batch or continuous reactors through a transesterification (or two-step esterification-transesterification) reaction under homogenous, heterogeneous or enzymatic catalyst. It can also be produced at supercritical conditions without catalyst due to the enhanced solubility of the mixture; however, these conditions are least favorable due to a high energy penalty necessary to maintain the supercritical conditions.

In a batch process, the WCO and methanol are brought together in a batch reactor while subjected to a continuous impeller mixing. As the reaction proceeds toward completion, the product is drained to a separation reservoir forming two distinct layers of products (FAME and glycerol) that can be easily separated. Unfortunately, the batch process suffers from high operating costs, reduced throughput, and increased product quality variation.

In known continuous processes, a tubular configuration is used where the reactant is continuously pumped into the reactor. To enhance the reaction, the configuration must allow an increase in surface area per unit volume, efficient entrainments and mixing to enhance mass transfer, and component solubility at low pumping power. Small flow rates can lead to stratified or laminar, two phase flow resulting in mass transfer limitations. High flow rates result in shorter residence time and high head loss. As a result, there is a need for a reactor design which is not mass transfer limited and which minimizes pumping loss, while increasing throughput and yield.

BRIEF DESCRIPTION OF THE DRAWINGS

These and other features and advantages will be better understood by reading the following detailed description, taken together with the drawings wherein.

DETAILED DESCRIPTION

A continuous transesterification system and method, consistent with embodiments described herein, uses a multi-chamber tubular reactor to convert vegetable, lipid, animal, trapped grease, or recycled cooking oil (collectively referred to herein as WCO with a general molar formula of $C_{54}H_{106}O_6$) and methanol ($CH_3OH$) into fatty acid methyl (or ethel in the case ethanol ($C_2H_5OH$) is used instead of methanol) esters (hereinafter referred to as FAME, biodiesel, or $C_{18}H_{36}O_2$) and glycerol ($C_3H_9O_3$). The multi-chamber tubular reactor receives, as inputs, the WCO and methanol. The input flow enters a first chamber of the multi-chamber tubular reactor circumferentially (e.g., a generally tangential line or a secant line) to create a swirling flow pattern/trajectory through the first chamber. The flow exits the first chamber and then circumferentially enters at least a second chamber (e.g., a generally tangential line or a secant line) to create a swirling pattern/trajectory through the second chamber.

The swirling flow patterns/trajectories have a substantial radial/circumferential flow component as well as a longitudinal flow component, thereby increasing the total residence time compared to the residence time based on the inlet velocity and the vertical length of the first and/or second chambers. The swirling patterns/trajectories also significantly enhance the mass transfer, thereby increasing conversion.

The multi-chamber tubular reactor also provides a compact design. Additionally, the multi-chamber tubular reactor is modularly scalable to increase/decrease throughput. For example, additional chambers (tubular reactors) can also be added/removed and/or the length of the chambers can be easily modified in a modular manner.

The multi-chamber tubular reactor also features a low pressure drop, thereby minimizing pumping power and head losses, and minimizing energy consumed by the transesterification process. The temperature of the multi-chamber tubular reactor is easily controlled (e.g., by way of a jacketed heating element to the tubes or by heating the inlet flow to a desired temperature (e.g., near 60° C.) while keeping the tube reactor thermally insulated) and may provide nearly isothermal reaction conditions.

Figure 2:
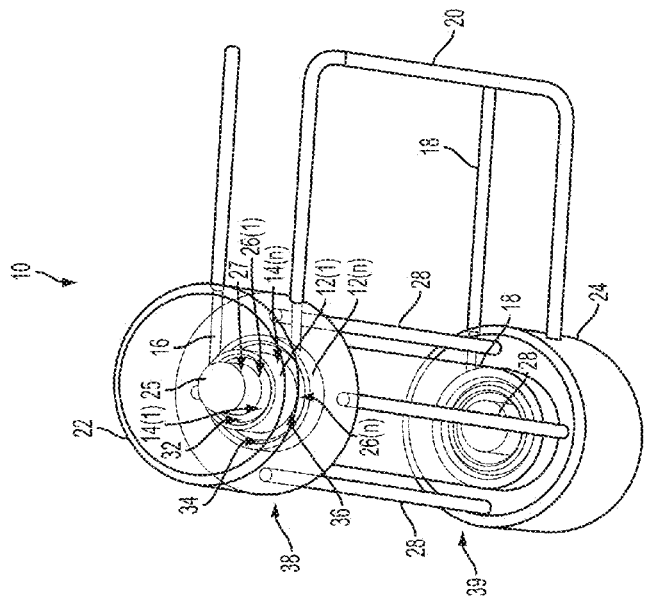
FIG. 2 is an end perspective view of the multi-chamber tubular reactor illustrated in FIG. 1.
Figure 1:
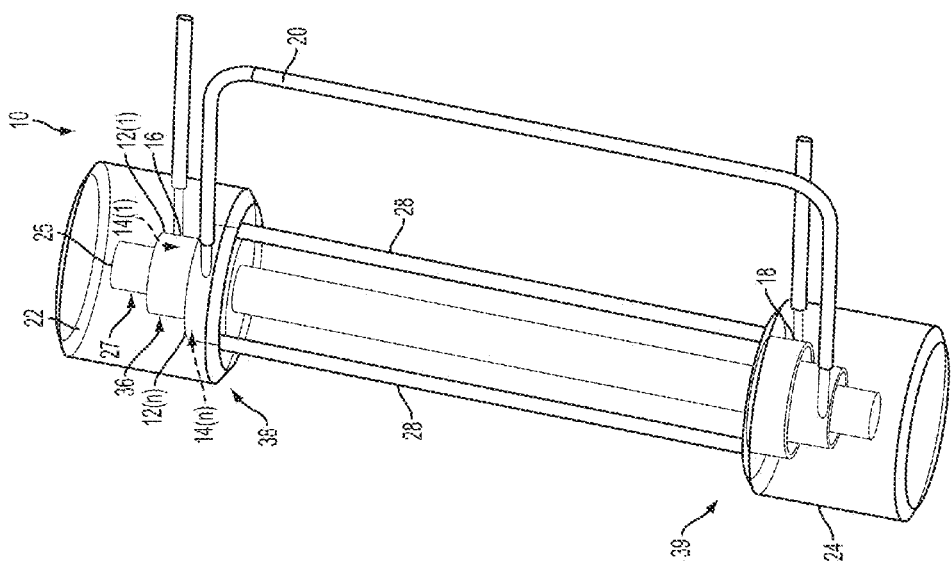
FIG. 1 is a side perspective view of a multi-chamber tubular reactor consistent with one embodiment of the present disclosure.

Turning now to FIGS. 1 and 2, a multi-chamber tubular reactor 10 consistent with at least one embodiment of the present disclosure is generally illustrated. The multi-chamber tubular reactor 10 includes a plurality of tubes 12(1)-(n), a plurality of fluidly coupled chambers 14(1)-(n), at least one inlet 16 coupled to at least one of the chambers (e.g., chamber 14(1)) for receiving the reactants (e.g., but not limited to, WCO and methanol) and at least one outlet 18 coupled to one of the chambers (e.g., chamber 14(n)) for receiving the product (e.g., but not limited to, FAME and glycerol). The multi-chamber tubular reactor 10 optionally includes one or more connecting tubes 20 which fluidly couple at least two of the chambers (e.g., chambers 14(1) and 14(n)). As discussed herein, the multi-chamber tubular reactor 10 also optionally includes one or more end caps 22, 24 disposed about proximal and/or distal ends of the multi-chamber tubular reactor 10. Additionally, the multi-chamber tubular reactor 10 may include one or more cores 25. The reactants (for example, but not limited to, WCO and methanol) are introduced into the chambers 14(1)-(n) through the inlet 16 and undergo transesterification in the chambers 14(1)-(n). The resulting FAME and glycerol exit the multi-chamber tubular reactor 10 through the outlet 18 and may be thereafter separated.

For the sake of clarity, the multi-chamber tubular reactor 10 of FIGS. 1 and 2 will be described having a "first or inner tube 12(1)," a "second or outer tube 12(n)," a "first or inner chamber 14(1)," and a "second or outer chamber 14(n)." It should be appreciated, however, that the multi-chamber tubular reactor 10 may include additional tubes and/or additional chambers disposed between the first and second tubes 12(1), 12(n) and/or first and second chambers 14(1), 14(n).

The plurality of tubes 12(1)-(n) define a plurality of lumens 26(1)-(n), respectively. The first tube 12(1) is at least partially disposed within a lumen 26(n) of the second tube 12(n). The lumen 26(n) of the second tube 12(n) therefore has a larger cross-section than the outer cross-section of the first tube 12(1). One or more of the plurality of tubes 12(1)-(n) may have a generally circular cross-section and/or may have a non-circular cross-section (e.g., oval, rectangular, or the like). The tubes 12(1)-(n) may be aligned parallel to each other, non-parallel to each other, concentrically about a common center, longitudinal axis, or origin, and/or may be aligned about a plurality of different centers, longitudinal axes, or origins. The tubes 12(1)-(n) may have the same of different lengths. The cross-section and lengths of the tubes 12(1)-(n) will depend on the desired throughput and/or space limitations of the intended application. One or more of the tubes 12(1)-(n) is constructed from materials that are chemically resistant to WCO, methanol, FAME, glycerol, intermediate products generated by, and/or of other materials used during the transesterification reaction. For example, the plurality of tubes 12(1)-(n) may be constructed from glass, ceramic, or metal (such as, but not limited to, stainless steel, or the like). The tubes 12(1)-(n) may also constructed from a material that can be coated with one or more catalysts are described herein.

The first chamber 14(1) may be radially defined by, at least in part, the space within the lumen 26(1) of the first tube 12(1). As noted herein, the multi-chamber tubular reactor 10 may optionally include a core 25 which is at least partially disposed within a lumen 26(1) of the first tube 12(1). The first chamber 14(1) may therefore be radially defined by the space within the lumen 26(1) of the first tube 12(1) between the inner surface 32 of the first tube 12(1) and the outer surface 27 of the core 25. The inclusion of the core 25 allows the inner chamber 14(1) to have a generally annular cross-sectional shape. The core 25 may be solid or may form one or more lumens (not shown) which may be used to regulate the temperature within the first chamber 14(1). It may be appreciated, however, that the core 25 may be eliminated.

The second chamber 14(n) may be radially defined by, at least in part, the space within the lumen 26(n) of the second tube 12(n) between the inner surface 34 of the second tube 12(n) and the outer surface of an adjacent tube. The second chamber 14(n) may have a generally annular cross-sectional shape as discussed herein. In the exemplary embodiment, the second chamber 14(n) is defined by the space within the lumen 26(n) between the inner surface 34 and the outer surface 36 of the first tube 12(1), though it should be appreciated that other tubes may be disposed between the second tube 12(n) and the first tube 12(1), and the inner perimeter of the second chamber 14(1) may therefore be defined by a tube other than the first tube 12(1). As may be appreciated, the multi-chamber tubular reactor 10 may include additional chambers, which may be radially defined by the space with a lumen of a tube between the inner surface of the tube and outer surface of an adjacent tube.

Optionally, the multi-chamber tubular reactor 10 includes one or more caps 22, 24. The caps 22, 24 may be disposed about a first and second generally opposite end, respectively, of the plurality of tubes 12(1)-(n). For example, the caps 22, 24 may be disposed about a proximal end 38 and distal end 39 of the plurality of tubes 12(1)-(n), respectively. The plurality of chambers 14(1)-(n) may be longitudinally defined by the caps 22, 24. Put another way, the ends of the plurality of chambers 14(1)-(n) may be defined by the caps 22, 24. One or more seals (e.g., but not limited to, fluorine reinforced (for example, polytetrafluoroethylene (PTFE) such as Teflon™, or the like) rubber or silicon ring seals may fluidly seal the plurality of tubes 12(1)-(n) to the caps 22, 24. The caps 22, 24 and the plurality of tubes 12(1)-(n) may be secured together using one or more fasteners or the like. For example, the caps 22, 24 and the plurality of tubes 12(1)-(n) may be welded together or secured together using an adhesive. Alternatively (or in addition), the caps 22, 24 and the plurality of tubes 12(1)-(n) may be secured together using at least one (e.g., two or more) tie bolts 28. The tie bolts 28 may be arranged evenly around the perimeter of the caps 22, 24 to secure the caps 22, 24 to the plurality of tubes 12(1)-(n).

The design of the multi-chamber tubular reactor 10 provides numerous benefits. For example, the multi-chamber tubular reactor 10 may be configured to have a compact design and the overall throughput of the multi-chamber tubular reactor 10 may be easily modified in a modular manner. More specifically, the capacity of the multi-chamber tubular reactor 10 may be adjusted by changing the lengths of the plurality of tubes 12(1)-(n), while still using the same caps 22. 24. The capacity of the multi-chamber tubular reactor 10 may also be adjusted by added or reducing the number of the tubes 12(1)-(n) to change the number of chambers 14(1)-(n). Additionally, the multi-chamber tubular reactor 10 features a low pressure drop and the temperature is easily maintained. For example, the temperature may be maintained isothermally using insulation jacket (not shown for the sake of clarity) disposed around the outer tube 12(n) (which may optionally include a heating and/or cooling medium) and/or providing heat transfer tubes (also not shown for the sake of clarity) disposed adjacent to one or more of the chambers 14(1)-(n) through which a heating/cooling medium may flow.

Optionally, one or more of the inner surfaces of the plurality of chambers 14(1)-(n) includes one or more heterogeneous catalysts, i.e. Calcium Oxide (CaO). The catalyst may speed up and/or reduce the energy requirements necessary for the transesterification reaction to proceed. The catalyst may include a coating disposed on the one or more of the inner surfaces of the chambers 14(1)-(n). For example, the catalyst may be disposed on a portion of the first chamber 14(1) (e.g., the inner surface 32 of the first tube 12(1) and/or the outer surface 27 of the core 25) and/or the second chamber 14(n) (e.g., the inner surface 34 of the second tube 12(*n*) and/or the outer surface 36 of the first tube 12(1)). The multi-chamber tubular reactor 10 therefore provides a great deal of flexibility and surface area for the catalyst such that the desired amount of catalyst may be provided within the multi-chamber tubular reactor 10 to allow the transesterification reaction to proceed with reduced energy requirements and/or increased rates of reaction. It should be appreciated, however, that the catalyst does not have to be disposed on the inner surfaces of the plurality of chambers 14(1)-(*n*). For example, the catalyst may be disposed on other surfaces within the multi-chamber tubular reactor 10 which contact the reactants and/or may be introduced in a form of homogeneous catalyst, i.e. Sodium hydroxide NaOH, which can be mixed with the reactants either before or within the multi-chamber tubular reactor 10 (e.g., the homogenous catalyst may be premixed prior to entering the multi-chamber tubular reactor 10 and/or the catalyst may be introduced into the multi-chamber tubular reactor 10 separately from the reactants).

The catalyst may include acid catalysts, base catalysts, and/or enzymatic catalysts which may be homogeneous (i.e., dissolve in methanol) or heterogeneous/solid (i.e., do not dissolve in methanol). Various catalysts can be used, such as alkaline hydroxides and methoxides, inorganic acids and their salts, transition-metal compounds, silicates, zeolites, and lipases. Examples of heterogeneous acid catalysts include, but are not limited to, Protonated Y zeolites (HY): H-BEA, H-ZSM-5, H-MOR, H-MFI, H-FAU, etc.; Keggin heteropolyacids: $H_nXM_{12}O_{40}(X=P, Si; M=Mo, W)$ and their salts (can be supported on $ZrO_2$, $TiO_2$, etc.); Mixed metal oxides (e.g. $ZrO_2$ and SnO sulfated and/or doped with Al, Ti, W, Si, or alkali metals); Sulfonic acid linked to a polymer framework (ion-exchange resins, e.g. Amberlyst-15, Nafion) or immobilized (e.g. organosulfonic acids on silica); and Fe—Zn double-metal cyanide comp. Examples of heterogeneous base catalysts include, but are not limited to, Zeolites exchanged with strongly basic cations (e.g. Cs, K) or containing other occluded basic species; Hydrotalcites of Mg—Al or Li—Al: $[Mg(1x)Alx(OH)_2]x+(CO_3)x/n_2-$; Metal oxides: CaO, MgO, $La_2O_3$, ZnO, etc.; Insoluble basic salts/hydroxides: species loaded on alumina (e.g. KI, KF, $K_2CO_3$, Na/NaOH), carbonates, etc.; bases: guanidines immobilized on polymers, salts of amino acids containing guanidino or quaternary ammonium groups, etc.; Basic oxides supported on high-surface-area materials (e.g. SBA-15, MCM-41); and Alkali earth alkoxides (e.g. $Ca(OMe)_2$). Examples of Enzymatic catalysts include, but are not limited to, extracellular or intracellular lipases.

As noted herein, the multi-chamber tubular reactor 10 also features at least one inlet 16 and at least one outlet 18 fluidly coupled to at least one plurality of chamber 14(1)-(*n*). The inlet 16 and outlet 18 may be fluidly coupled to different chambers 14(1)-(*n*). For the sake of clarity, the inlet 16 will be described as being fluidly coupled to the first or innermost chamber 14(1) and the outlet 18 will be described as being fluidly coupled to the second or outer-most chamber 14(*n*); however, it should be appreciated that the inlet 16 and/or outlet 18 may be fluidly coupled to other chambers. For example, the inlet 16 may be coupled to the outer-most chamber 14(*n*) and/or a chamber in between the inner-most and outer-most chambers and the outlet 18 may be coupled to the inner-most chamber 14(1) and/or a chamber in between the inner-most and outer-most chambers. The inlet 16 and outlet 18 may be disposed proximate to and/or at one of the ends of the chambers 14(1)-(*n*) or the multi-tubular reactor 10, for example, the distal and/or proximal ends 38, 39 of the chambers 14(1)-(*n*). The inlet 16 and outlet 18 may be disposed at opposite ends of the chambers 14(1)-(*n*) or multi-tubular reactor 10. While the exact dimensions of the multi-chamber tubular reactor 10 will depend on the intended application, one exemplary embodiment of the multi-chamber tubular reactor 10 having a flow capacity of 15-25 liter/hour may have the following nominal dimensions: an overall height of 30 cm and a diameter of 8 cm, a core tube 25 having a height of 26 cm and a diameter of 4.5 cm, an inner/middle tube 12(1) having a height of 22 cm and an internal diameter of 5.0 cm, and an outer tube 12(*n*) having a height of 18 cm and an internal diameter of 7.5 cm (the inner/middle and outer tubes 12(1), 12(*n*) as well as the core tube 25 have a wall thickness of 0.25 cm), and inlet and outlet pipes having a diameter of 4 mm.

The inlet 16 may be fluidly coupled to the first chamber 14(1) proximate to the first end 38 in such a manner as to generate a swirling, rotational, or generally overall-helical flow pattern/trajectory through the first chamber 14(1) as the reactants flow from the first end 38 towards the second end 39. As the flow reaches the second end 39 of the first chamber 14(1), the flow exits the first chamber 14(1) through an outlet which is fluidly coupled to an inlet of another chamber (e.g., the second chamber 14(*n*)). Additional chambers may be fluidly coupled in this manner. The inlets into the second and/or additional chambers may be configured to generate a swirling, rotational, or generally overall-helical flow pattern/trajectory through the second/additional chambers 14(*n*) in a manner similar to the first chamber 14(1). The flow through the second and/or additional chambers may be in the same longitudinal direction as the flow through the first chamber 14(1) and/or opposite.

For example, the subsequent chambers (e.g., adjacent chambers) may be fluidly coupled to each other through one or more passages or ports (not shown for clarity) in one or more of the caps 22, 24. Alternatively (or in addition), subsequent chambers may be fluidly coupled to each other using an optional connecting tube 20. The connecting tube 20 may be configured to allow the flow from the first chamber 14(1) to exit the second end 39 and enter the first end 38 of the second chamber 14(*n*) such that the materials flow in the same longitudinal direction as the first chamber 14(1). It should be appreciated, however, that the connecting tube 20 may also allow the materials to flow in the opposite direction. The connecting tube 20 optionally includes an intermediate regulated outlet (not shown). The intermediate regulated outlet may include a three-junction valve configured to allow for sampling and/or regulation of the flow based on the quality of the sample (i.e. accelerate the flow if high quality achieved or slow down the flow if lower quality is achieved, the quality of the product is tested via GCMS specialized FAME column that detect the unconverted tri-, di-, and monoglycerides). The connecting tube 20 may be disposed externally (as illustrated) with respect to the plurality of tubes 12(1)-(*n*) and/or internally (e.g., the connecting tube 20 may be at least partially disposed in one of the tubes 12).

As discussed herein, the inlets 16 may be fluidly coupled to the chambers 14(1)-(*n*) to generate a swirling, rotational, or generally overall-helical flow pattern/trajectory through the chambers 14(1)-(*n*). For example, the inlet 16 may be fluidly coupled circumferentially to the first chamber 14(1). The inlet 16 may also be fluidly coupled to the first chamber 14(1) generally tangentially to the curvature of the first chamber 14(1). The inlet 16 may also be fluidly coupled to the first chamber 14(1) at an angle such that a flow axis extending from the inlet 16 extends along a generally secant line, which optionally does not pass through the center point of the first chamber 14(1).

The reactants are injected/introduced into the first chamber 14(1) through the inlet 16, by means of one or more pumps, at relatively high velocity and/or high Reynolds number (Re). The pumps (which are not shown for clarity) may include, but are not limited to, external peristaltic or diaphragm pumps that operate at a relatively low head and adjustable flow rate up to, for example, 1000 ml/min. The Re of the reactant flow is selected to be beyond laminar flow, e.g., the Re may be selected to be greater than or equal to Re 2300. According to one embodiment, the Re is selected to provide for turbulent flow, e.g., Re greater than or equal to 4000. According to yet another embodiment, the Re is selected to provide for highly turbulent flow, e.g., Re greater than or equal to 6000. The velocity will depend upon the dimensions of the inlet 16 and/or the first chamber 14(1). For example, the inlet velocity may be selected to be approximately $1.89e^1$ m/s.

The generally helical flow pattern generated by the multi-tubular reactor 10 provides numerous benefits. For example, the turbulent flow and high inlet velocity results in homogenous mixing of the reactants with minimal total pressures loss while avoiding mass transfer limitations during the transesterification process. Unlike many systems which require several times greater than a stoichiometric ratio of methanol to WCO, the increased mixing and the resulting reduction/elimination of the mass transfer limitations allows the multi-chamber tubular reactor 10 to be operated at or near the stoichiometric ratio of methanol to WCO.

Additionally, the amount of energy needed to operate the multi-tubular reactor 10 is reduced because of the generally helical flow pattern generated by the multi-tubular reactor 10 which eliminates the need for external agitation (e.g., an external mixer) as well as the low total pressure loss within the short tubing 12(1)-(n). Because the multi-tubular reactor 10 features a plurality of tubes 12(1)-(n) and a plurality of chambers 14(1)-(n) in a stacked (e.g., concentric) configurations, the overall lengths of each individual tube 12(1)-(n) and chamber 14(1)-(n) may be selected to be relatively short. As a result, a generally helical flow pattern may be more easily maintained within each chamber 14(1)-(n) compared to a single tubular reactor without the need for external mixers.

Figure 3:
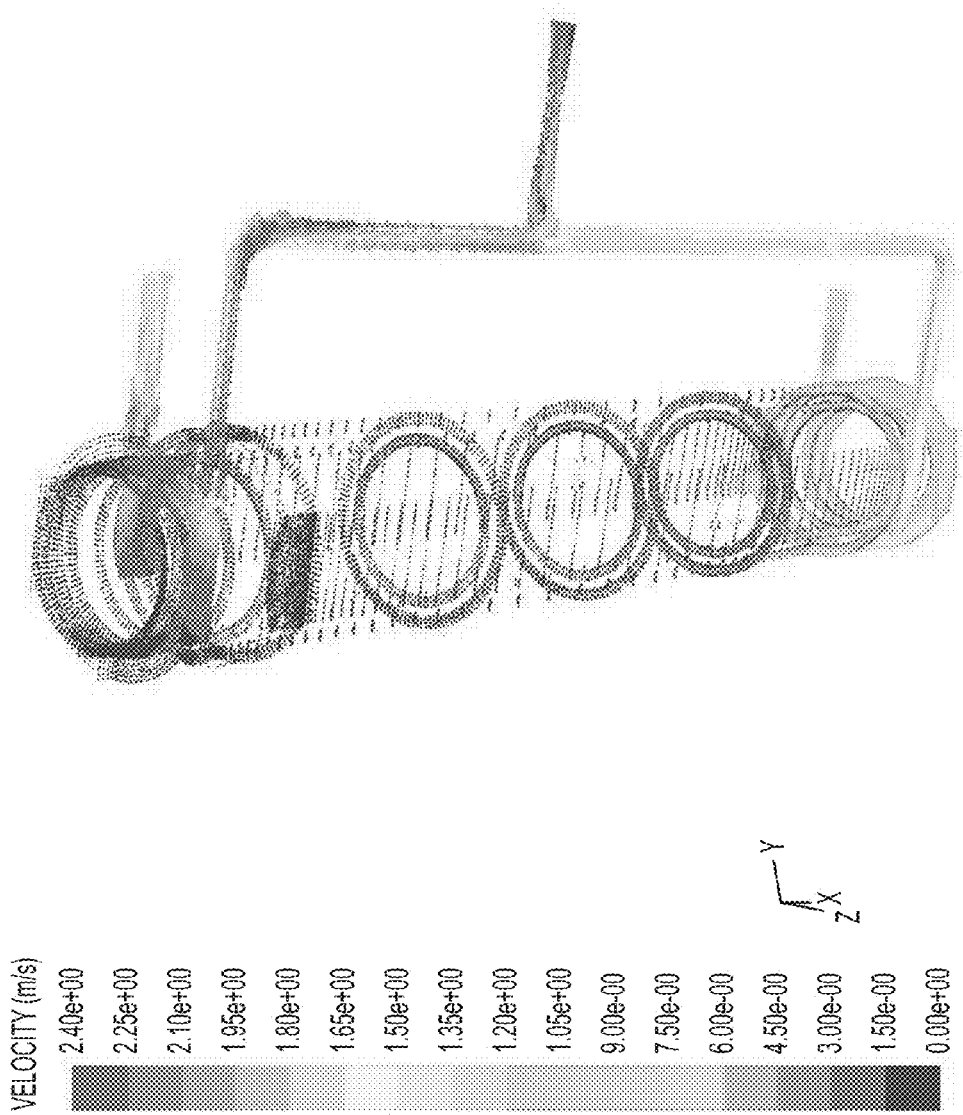
FIG. 3 is a diagram illustrating a simulated velocity flow and magnitude of the reactants through a multi-chamber tubular reactor consistent with at least one embodiment of the present disclosure.

The generally helical flow pattern also increases the residence time of the reactants in the chambers 14(1)-(n) and also increases the interaction of the catalyst with the reactants, thereby facilitating the transesterification reaction. The generally helical flow pattern increases the residence time of the materials by increasing the length of the flow path through the chambers 14(1)-(n) due to the radial velocity and reduced longitudinal velocity of the materials. The increased residence time of the reactants, the increased interaction of the reactants with the catalyst, as well as the "stacked" nature of the plurality of chambers 14(1)-(n), allows the overall dimensions of the multi-chamber tubular reactor 10 to be reduced compared to other continuous reactors. Simulated velocity flow and magnitude 42 are provided in FIG. 3 for illustrative purposes. Simulations have shown that the average velocity within the reactor is about 0.15 m/s which gives an equivalent residence time of nearly 2 seconds (based on tube length of 0.26 m divided by the average velocity of 0.15 m/s which equals about 1.73 seconds). This residence time is much larger than the residence time based on the inlet velocity (2 m/s) and the length of reactor (0.26 cm) for which the division gives nearly 0.13 second of residence time.

Figure 4:
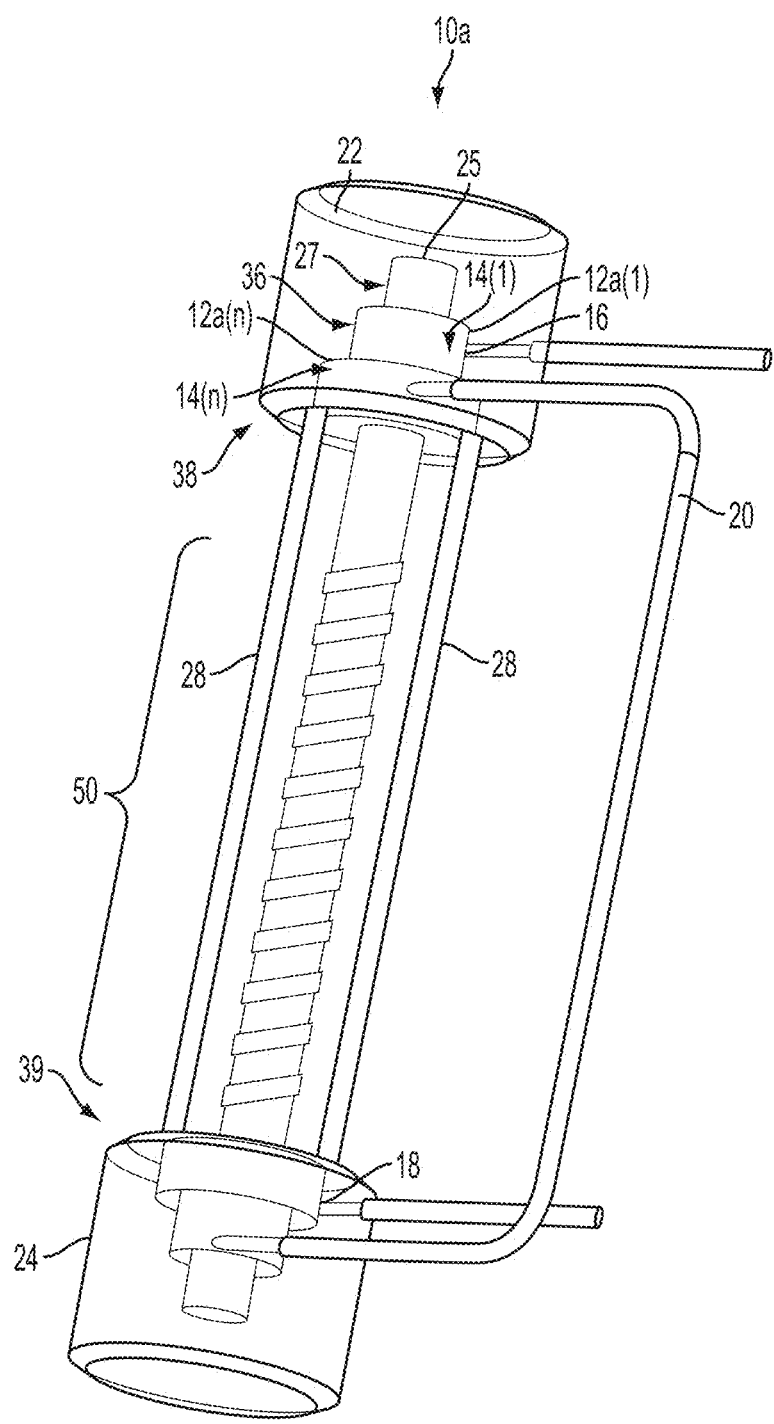
FIG. 4 is a side perspective view of a multi-chamber tubular reactor consistent with another embodiment of the present disclosure including at least one static mixer.

Turning now to FIG. 4, another embodiment of the multi-tubular reactor 10a is generally illustrated. The multi-tubular reactor 10a may be similar the multi-tubular reactor 10 described herein, however, the multi-tubular reactor 10a features a plurality of tubes 12a(1)-(n) which include one or more static mixers 50 configured to impart a generally helical flow pattern within the chambers 14(1)-(n). For example, the static mixers 50 may include generally helical flow diverters, diverter vanes, generally helical fins, threads, or the like, and may be used in conjunction with (or in the absence of) the inlet 16 which is configured to generate a generally helical flow pattern as discussed herein. The static mixer 50 may be disposed on any internal surface of the chambers 14(1)-(n), and may extend partially and/or completely from one internal surface of the chambers 14(1)-(n) to the other.

The static mixers 50 may be particularly beneficial as the lengths of the plurality of tubes 12a(1)-(n) is extended. As may be appreciated, maintaining a generally helical flow pattern within the chambers 14(1)-(n) becomes more difficult as the lengths of the tubes 12a(1)-(n) become longer because the radial velocity begins to dimension over the lengths of the tubes 12a(1)-(n). The static mixers 50 are configured to aid in generating the generally helical flow pattern, and may therefore allow the lengths of the tubes 12a(1)-(n) to be extended without the need for external mixers which require energy to drive them. The static mixer 50 may also generate vertices within the chambers 14(1)-(n). The vortices may further increase the residence time within the chambers 14(1)-(n), thereby allowing the lengths of the tubes 12a(1)-(n) to be reduced.

Accordingly, at least one embodiment of the present disclosure features a system, method, and apparatus that is particularly suited for the transesterification of waste cooking oil (WCO) into biodiesel. The reactor features a compact and modular multi-chamber tubular reactor. The multi-tubular reactor may feature two or more coincided, separated chambers having a low pressure drop and in which the temperature is easily controlled, for example, through exterior cloth insulation of the outer tube, thereby allowing the reaction to run substantially isothermally. Some of the advantages of the multi-tubular reactor include its compact design, modularity and flexibility to adjust for different throughputs (e.g., chambers may be added or eliminated by adding or eliminating tube stacks and/or by replacing the tubes with longer or shorter tubes while using the same end caps).

The reactants may be introduced into the chambers to generate a swirling, rotational, or generally overall-helical flow pattern/trajectory through one or more of the chambers. The generally overall-helical flow pattern/trajectory increases the residence time for the transesterification reaction completion, while also allowing the multi-tubular reactor to have a compact (e.g., shorter) design. Additionally, the multi-tubular reactor allows for the flexibility to include a catalyst at one or more of the two interior surfaces of the chambers. For example, the heterogeneous catalyst may be included at the two interior surfaces of the middle tube chamber separator (inner and outer), at the outside surface of the inner most tube (of the inner chamber), and at the inside surface of the outer most tube, or any combination of these four surfaces. Because of the tubular design and the generally overall-helical flow pattern/trajectory, the overall total pressure loss within the short tubing and the two chambers is minimized and no external mixers are necessary, resulting in reduced amount of energy necessary to drive the multi-tubular reactor. Testing of a multi-tubular reactor consistent with at least one embodiment of the present disclosure shows an improved performance (e.g., % of WCO converted into FAME, reduced mole ratios of WCO and methanol, and/or reduced overall power necessary to drive the reactor) compared to batch reactors and single surface tubular reactors, as well as a compact configuration which is easily scaled up or down based on the desired throughput.

Consistent with an embodiment, the present disclosure features a reactor. The reactor may be used for the transesterification of oil (e.g., waste cooking oil or the like) and methanol (or ethanol) into glycol and fatty acid methyl ester (or fatty acid ethel ester). The reactor includes a plurality of tubes, a plurality of fluidly coupled chambers, an inlet fluidly coupled to a first chamber of the plurality of chambers for receiving reactants, and an outlet fluidly coupled to a second chamber of the plurality of chambers for receiving products generated during a reaction within the plurality of chambers. At least one of the plurality of tubes is at least partially disposed within a lumen of another one of the plurality of tubes. The plurality of fluidly coupled chambers are defined, at least in part, by the plurality of tubes. The reactor is configured to generate a generally helical flow pattern through at least one of the plurality of chambers.

Consistent with another embodiment, the present disclosure features a method of transesterification of oil (e.g., waste cooking oil and the like). The method includes introducing oil and methanol into a first chamber and subsequently into a second chamber, the first chamber defined, at least in part, by a first lumen of a first tube, and the second chamber defined, at least in part, by a second lumen of a second tube, wherein the first tube being at least partially disposed within the second lumen. The method also includes generating a generally helical turbulent flow pattern through at least one of the first and the second chambers in the presence of a catalyst to facilitate the transesterification of the oil into glycerol and at least one of fatty acid methyl ester and fatty acid ethel ester. The method further includes removing the glycerol and the at least one of fatty acid methyl ester and fatty acid ethel ester from the second chamber.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A reactor comprising:
   a plurality of tubes, wherein at least one of said plurality of tubes is at least partially disposed within a lumen of another one of said plurality of tubes;
   a plurality of fluidly coupled chambers defined, at least in part, by said plurality of tubes; at least one inlet fluidly coupled to a first chamber of said plurality of chambers for receiving reactants; and
   at least one outlet fluidly coupled to a second chamber of the plurality of chambers for receiving products generated during a reaction within said plurality of chambers;
   wherein said reactor is configured to generate a generally helical flow pattern through at least one of said plurality of chambers; and
   a connecting tube which fluidly couples at least two of said plurality of chambers such that both chambers flow in the same direction.

2. The reactor of claim 1, wherein said inlet is configured to generate said generally helical flow pattern through at least one of said plurality of chambers.

3. The reactor of claim 2, wherein said inlet is disposed circumferentially to said first chamber.

4. The reactor of claim 2, wherein said inlet is disposed substantially tangentially to said first chamber.

5. The reactor of claim 2, wherein a flow axis extending outwardly from said inlet is generally disposed along a secant line that does not pass through a center of said first chamber.

6. The reactor of claim 1, wherein said plurality of tubes comprises a first tube defining a first lumen and at least a second tube defining a second lumen, said first tube being at least partially disposed within said second lumen, and wherein said first and said second lumens define, at least in part, said first and said second chambers, respectively.

7. The reactor of claim 6, wherein said second chamber is radially defined by a generally annular cross-sectioned space within said second lumen between an inner surface of said second tube and an outer surface of said first tube.

8. The reactor of claim 7, further comprising a core at least partially disposed within said first lumen of said first tube, wherein said first chamber is radially defined by a generally annular cross-sectioned space within said first lumen between an inner surface of said first tube and an outer surface of said core.

9. The reactor of claim 8, wherein said core is solid.

10. The reactor of claim 8, wherein said core defines one or more lumens configured to regulate a temperature within said first chamber.

11. The reactor of claim 8, wherein at least one of said inner surface of said second tube, said outer surface of said first tube, said inner surface of said first tube, and said outer surface of said core comprises a catalyst disposed thereon.

12. The reactor of claim 1, further comprising a valve fluidly coupled to said connecting tube.

13. The reactor of claim 1, further comprising a first and a second end cap disposed about a first and second generally opposite end of said plurality of tubes, respectively, wherein said first and said second caps define longitudinal ends of said plurality of chambers.

14. The reactor of claim 13, wherein said at least one of said first and said second caps includes a passageway configured to fluidly couple at least two of said plurality of chambers.

15. The reactor of claim 1, further comprising at least one static mixing feature disposed within at least one of said plurality of chambers, said at least one static mixer configured to generate said generally helical flow pattern through at least one of said plurality of chambers.

16. The reactor of claim 15, wherein said at least one static mixer is selected from the group consisting of generally helical flow diverters, diverter vanes, generally helical fins, and threads.

17. A reactor comprising:
   a plurality of tubes, wherein at least one of said plurality of tubes is at least partially disposed within a lumen of another one of said plurality of tubes;
   a plurality of fluidly coupled chambers defined, at least in part, by said plurality of tubes;

at least one inlet fluidly coupled to a first chamber of said plurality of chambers for receiving reactants; and at least one outlet fluidly coupled to a second chamber of the plurality of chambers for receiving products generated during a reaction within said plurality of chambers;

wherein said reactor is configured to generate a generally helical flow pattern through at least one of said plurality of chambers;

a connecting tube which fluidly couples at least two of said plurality of chambers; and a valve fluidly coupled to said connecting tube.

* * * * *